United States Patent
Vanelli et al.

(12) 
(10) Patent No.: US 11,578,201 B2
(45) Date of Patent: Feb. 14, 2023

(54) BIODEGRADABLE MATERIAL FOR ADDITIVE MANUFACTURING

(71) Applicant: EOS of North America, Inc., Novi, MI (US)

(72) Inventors: Donald L. Vanelli, Novi, MI (US); Richard B. Booth, Novi, MI (US); Karl Freihart, Novi, MI (US)

(73) Assignee: EOS of North America, Inc., Novi, MI (US)

(*) Notice: Subject to any disclaimer, the term of this patent is extended or adjusted under 35 U.S.C. 154(b) by 30 days.

(21) Appl. No.: 17/143,576

(22) Filed: Jan. 7, 2021

(65) Prior Publication Data

US 2021/0206961 A1 Jul. 8, 2021

Related U.S. Application Data

(60) Provisional application No. 62/958,353, filed on Jan. 8, 2020.

(51) Int. Cl.
*B33Y 70/00* (2020.01)
*B33Y 80/00* (2015.01)
(Continued)

(52) U.S. Cl.
CPC ............... *C08L 33/24* (2013.01); *B33Y 70/00* (2014.12); *B33Y 80/00* (2014.12); *B33Y 10/00* (2014.12); *C08L 2201/06* (2013.01)

(58) Field of Classification Search
CPC ...... C08L 33/24; C08L 2201/06; B33Y 70/00; B33Y 80/00; B33Y 10/00
See application file for complete search history.

(56) References Cited

U.S. PATENT DOCUMENTS

2008/0103232 A1 5/2008 Lake et al.
2013/0337530 A1 12/2013 Lake et al.
(Continued)

FOREIGN PATENT DOCUMENTS

AU 696330 9/1998
DE 4410046 5/1995
(Continued)

OTHER PUBLICATIONS

PCT Search Report and Written Opinion for Application No. PCT/EP2021/068508, dated Mar. 14, 2022, 13 pages.
(Continued)

*Primary Examiner* — Rick K Chang
(74) *Attorney, Agent, or Firm* — Seyfarth Shaw LLP

(57) ABSTRACT

Disclosed is an additive manufacture material made from polymers and designed to be biodegradable in a landfill or oceanic environment. The material may be made of bio-based polymers made from caster beans, cellulose, corn, starch, sugarcane, etc., such as nylon 11, bio-based polyethylene, polylactic acid, polyhydroxyalkanote, polyvinyl acetate, etc., to which is added microorganism, such as a bacteria, an enzyme or other additive to facilitate/accelerate the decomposition of the polymer in an environment where the object made through AM has been disposed, e.g., discarded after useful life. The microorganism or other additives that facilitate/accelerate the decomposition of polymers can also be added to petroleum-based, non bio-based polymers.

9 Claims, 3 Drawing Sheets

Regarding: ASTM D 5511-18 update - 83 days

| | Inoculum | Negative | Positive | Nylon 11 with 0.5% biodegradation additive #1 (MB-67) | Nylon 11 with 1.0% biodegradation additive #2 (BS201) |
|---|---|---|---|---|---|
| Cumulative Gas Volume (mL) | 922.4 | 888.4 | 8575.9 | 2329.1 | 2996.5 |
| Percent CH4 (%) | 31.7 | 22.8 | 37.0 | 29.0 | 34.4 |
| Volume CH4 (mL) | 292.5 | 202.7 | 3170.7 | 676.2 | 1031.5 |
| Mass CH4 (g) | 0.21 | 0.14 | 2.26 | 0.48 | 0.74 |
| Percent CO2 (%) | 44.5 | 42.8 | 44.2 | 43.6 | 43.1 |
| Volume CO2 (mL) | 410.4 | 380.2 | 3787.1 | 1016.2 | 1292.8 |
| Mass CO2 (g) | 0.81 | 0.75 | 7.44 | 2.00 | 2.54 |
| Sample Mass (g) | 10 | 10 | 10 | 20.0 | 20.0 |
| Theoretical Sample Mass (g) | 0.0 | 8.6 | 4.2 | 12.5 | 12.5 |
| Biodegraded Mass (g) | 0.38 | 0.31 | 3.73 | 0.91 | 1.25 |
| Percent Biodegraded (%) | | -0.7 | 79.4 | 4.2 | 6.9 |
| *Adjusted Percent Biodegraded (%) | | -0.9 | 100.0 | 5.3 | 8.8 |

* Outside of the ASTM D5511 method and on the assumption that the positive control (Cellulose) will fully biodegrade, all value have been proportionally adjusted

(51) Int. Cl.
    *B33Y 10/00*    (2015.01)
    *C08L 33/24*    (2006.01)

(56) References Cited

U.S. PATENT DOCUMENTS

2017/0362418 A1    12/2017    LaPray et al.
2018/0222111 A1*   8/2018     Bayer .................... C08J 11/08
2019/0256681 A1    8/2019     LaPray et al.
2020/0140706 A1    5/2020     Pfister et al.

FOREIGN PATENT DOCUMENTS

KR    20190081840    7/2019
WO    2014167518     10/2014
WO    2020099236     5/2020

OTHER PUBLICATIONS

Database WPI Week 201963 Thomson Scientific, London, GB; AN 2019-62410G, 3 pages.
Shuai, C. et al. "Montmorillonite reduces crystallinity of poly-l-lactic acid scaffolds to accelerate degradation" Polymers for Advanced Technologies 2019, 30, pp. 2425-2435).
B. Panganiban et al., Science 2018, V. 359, I. 6381, pp. 1239-1243.

* cited by examiner

Regarding ASTM D 5511-18 update - 83 days

| | Inoculum | Negative | Positive | Nylon 11 with 0.5% biodegradation additive #1 (MB-67) | Nylon 11 with 1.0% biodegradation additive #2 (BS201) |
|---|---|---|---|---|---|
| Cumulative Gas Volume (mL) | 922.4 | 888.4 | 8575.9 | 2329.1 | 2998.5 |
| Percent CH$_4$ (%) | 31.7 | 22.8 | 37.0 | 29.0 | 34.4 |
| Volume CH$_4$ (mL) | 292.5 | 202.7 | 3170.7 | 676.2 | 1031.5 |
| Mass CH$_4$ (g) | 0.21 | 0.14 | 2.26 | 0.48 | 0.74 |
| Percent CO$_2$ (%) | 44.5 | 42.8 | 44.2 | 43.6 | 43.1 |
| Volume CO$_2$ (mL) | 410.4 | 380.2 | 3787.1 | 1016.2 | 1292.8 |
| Mass CO$_2$ (g) | 0.81 | 0.75 | 7.44 | 2.00 | 2.54 |
| Sample Mass (g) | 10 | 10 | 10 | 20 | 20.0 |
| Theoretical Sample Mass (g) | 0.0 | 8.6 | 4.2 | 12.5 | 12.5 |
| Biodegraded Mass (g) | 0.38 | 0.31 | 3.73 | 0.91 | 1.25 |
| Percent Biodegraded (%) | | -0.7 | 79.4 | 4.2 | 6.9 |
| * Adjusted Percent Biodegraded (%) | | -0.9 | 100.0 | 5.3 | 8.8 |

* Outside of the ASTM D5511 method and on the assumption that the positive control (Cellulose) will fully biodegrade, all value have been proportionally adjusted

FIG. 1

BIODEGRADABLE MATERIAL FOR ADDITIVE MANUFACTURING

FIELD OF THE INVENTION

The invention relates to the field of additive manufacture wherein a three dimensional object is generated through layerwise build-up of material corresponding to consecutive cross sections of the object to be built. In particular, the invention relates to a biodegradable material for such additive manufacture.

BACKGROUND OF THE DISCLOSURE

Additive manufacturing offers the potential for production of customized parts as well as certain business advantages such as just in time production—thus maximizing performance of a part for a customer or application while at the same time enabling a business to run with limited or no inventory.

However, in the field of polymer additive manufacturing, the same challenges continue to exist with respect to end of life disposal of plastic parts as they do with all traditional plastics. At this time there are no known commercially available environmentally friendly, i.e., biodegradable, materials, such as polymers, available for additive manufacture (AM). AM of the type in point here is very often referred to as 3D printing. The present disclosure is discussed in the context of polymeric powders in particular used in powder bed fusion AM processes, but the invention is considered to be broader in scope, and applicable to other AM processes.

SUMMARY OF THE INVENTION

The present invention in one form is an AM material made from polymers and designed to be biodegradable in a landfill or oceanic environment. The material may be made of bio-based polymers made from caster beans, cellulose, corn, starch, sugarcane, etc., such as nylon 11, bio-based polyethylene, polylactic acid, polyhydroxyalkanote, polyvinyl acetate, etc., to which is added microorganism, such as a bacteria, an enzyme or other additive to facilitate/accelerate the decomposition of the polymer in an environment where the object made through AM has been disposed, e.g., discarded after useful life. This would typically be the decomposition or compo stability of the biodegradable treated polymer in a landfill environment. The microorganism or other additives that facilitate/accelerate the decomposition of polymers can also be added to petroleum-based, non bio-based polymers.

The same process can also be applied to non-bio based polymers such as those manufactured from petroleum bases (e.g., nylon-12), for example by mixing an additive like Ecopure from Bio-Tec Environmental, LLC (www.go-ecopure.com) into a petroleum based polymer. The Ecopure additives are organic compounds that attract microbes when the waste polymer product is placed in a microbe rich environment such as a landfill.

BRIEF DESCRIPTION OF THE DRAWINGS

FIG. 1 illustrates a chart compiling testing data of the degradation process according to at least one of the presently disclosed embodiments.

DESCRIPTION OF EMBODIMENTS OF THE INVENTION

Figure 2:
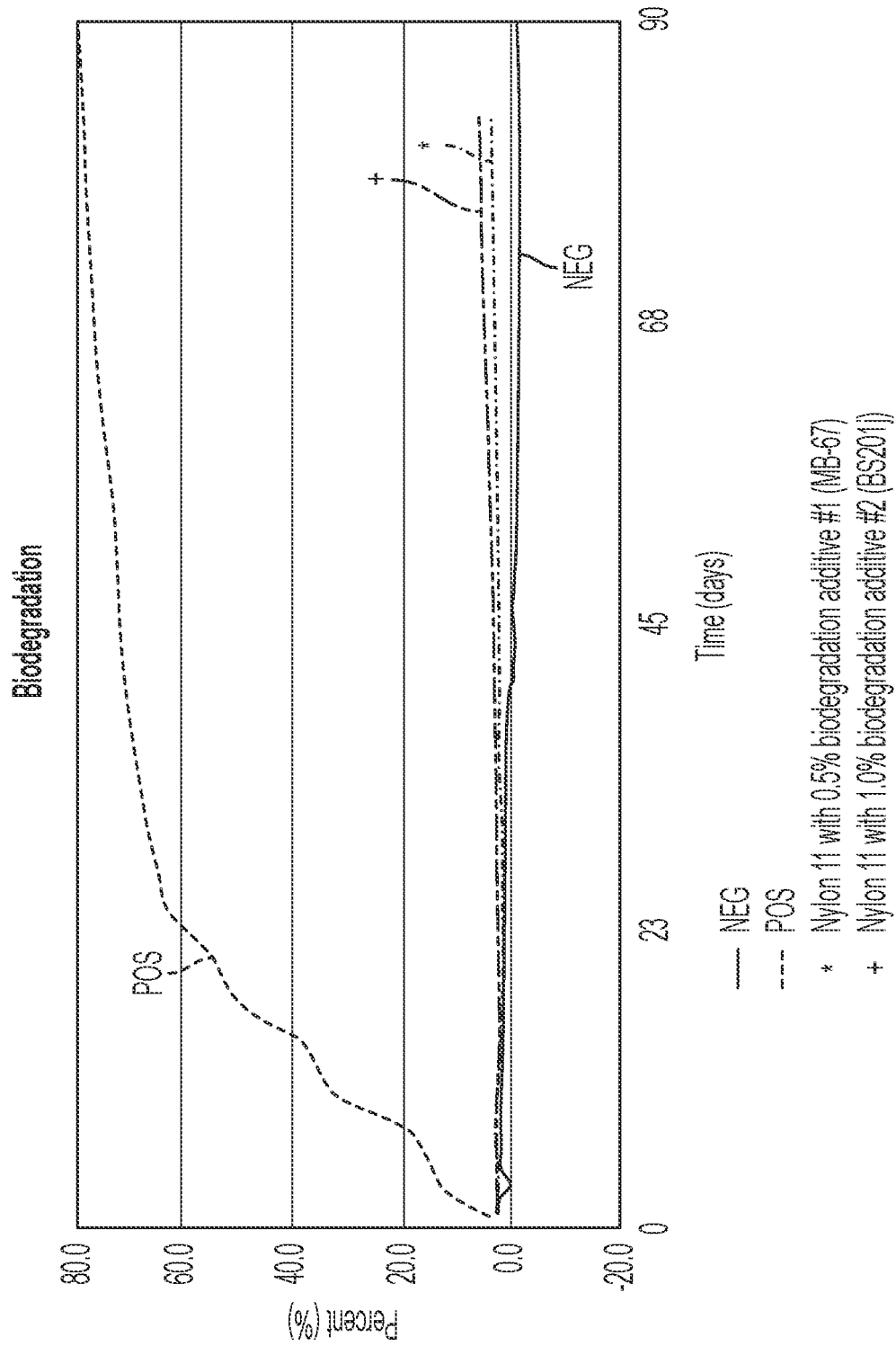
FIG. 2 illustrates a graph showing biodegradation over time according to at least one of the presently disclosed embodiments.

In some forms of the inventive materials and method of making the materials, applicable additives considered would be:

Enzymes

Polymerisation for several technical polymers (e.g. polycondensation products like PA, PC, PET) is an equilibrium driven reaction: monomer(s) $\rightleftharpoons$ polymer+side product e.g.: laurinlactam $\rightleftharpoons$ polyamide 12+water Here, changing the composition of the system, e.g. by removing/consuming one of the components, the equilibrium is shifted. Different degrading enzymatic additives would consume the depolymerisation products (monomers, oligomers), thereby the equilibrium is directed towards forming these degradation products.

Examples known in literature, but not heretofore applied to AM, are:

Nylonase (PA6 degradation)

Manganese peroxidase (lignin degradation)→no thermal stability data available e.g. Negoro, Seiji (2009): Biodegradation of Nylon and other Synthetic Polyamides. In: Alexander Steinbüchel (Hg.): Biopolymers. Biology, chemistry, biotechnology, applications. Weinheim: Wiley-VCH.

Crystallization Inhibitors

Minerallic or organic additives that reduces the crystallinity in parts, thus attack on the polymer by surrounding conditions (moisture, pH, solvent, acids) could be used. Such are disclosed for instance in e.g. Montmorillonite for PLLA (Shuai, C.; Li, Y.; Feng, P.; Yang, W.; Zhao, Z.; Liu, W. Montmorillonite reduces crystallinity of poly-1-lactic acid scaffolds to accelerate degradation. Polymers for Advanced Technologies 2019, 30, 2425-2435.) But again, not heretofore applied to AM manufacture.

Salts

Water sensitive/water soluble salts that induce a change in pH-value to support degradation (depolymerisation) and thus act as catalysts, could be applied in another form of the invention. For instance, Acetate salts (e.g. potassium~(degradation >>200° C.), sodium~(degradation >300° C.), calcium~(degradation >160° C.)

Formate salts (e.g. sodium formate: degradation 261° C.)

Hygroscopic salts, forming mild basic conditions might support depolymerisation

Sodium carbonate, aqueous (at increased temperature).

Specific Exemplary Embodiments

Any of the above additives could be incorporated into the AM polymer in the form of compounding or dry mixing into an existing powder. In the case of compounding, the raw material polymer and the additive would be melt mixed together and then extruded into a pellet or other shape (fiber, etc). The resulting shape would then be size reduced into a powder usable in powder bed fusion additive manufacturing such as would be useful for selective laser sintering (SLS), a process commercialized by EOS GmbH. Similarly, said polymer mixture could be extruded into other forms useful in other additive manufacturing processes, such as a filament for used in FDM, a process popularly commercialized by Stratasys Inc.

Certain additives can also be incorporated directly into powder. In this case, known SLS powders such as EOS PA 2200 (nylon-12 petroleum based powder) or EOS PA 1101 (nylon-11 castor bean based powder) would be mixed in a blender with the additive, also present in powder form. EOS PA 2200 and EOS PA 1101 are both products of EOS GmbH.

There are multiple choices of additives available for to enhance or introduce biodegradability in polymers available on the market. Three such examples are provided by Bio-Tec in their Ecopure line. These examples are:

Ecopure EVA Powder EP-06P-EVA. This is a powder in the sub 600 micron range which would have to be further size reduced for the SLS powders typical in the additive market today to be dry blended as an additive. EP-06P-EVA is typically used in concentrations around 1% by weight in and is most effective for producing bio-degradability in polypropylene, nylons, and thermoplastic elastomers. EP-06P-EVA powder further classified to remove particles in excess of 200 microns and added in a 1% by weight mixture to EOS PA 2200, EOS PA 1101 and a specialty polypropylene manufactured by Braskem and powderised by Advanced Laser Materials, LLC of Temple, Tex. ("PP 05") are specific mixtures embodied.

Ecopure EP-04C-NY. A pelletized material suitable for either powderising and dry mixing or melt mixing. This material features a high melting point of 220 degrees Celsius which is advantageous for mixing with certain SLS polymers and processing in the SLS process. For example, when mixed with EOS PA 2200 which has a melting point in powder form of 184 degrees Celsius, the EP-04C-NY offers the advantage of not melting at the processing temperature of the SLS machine (e.g. 180 degrees C. in an EOS P396 sintering system when running EOS PA 2200). However, it would melt under the temperature of the laser when the PA 2200 is melted to form a part. EP-04C-NY can be used further in concentrations around 0.5% by weight.

Ecopure EP-01B-EVA. A similar additive to EP-04C-NY but offering the particular advantage of having higher melt flow (measured at 10-28 g/10 minutes at 190 degrees C. under a 2.16 kg weight tested according to ASTM D1238). This higher melt flow has the advantage of more efficient mixing in the molten state, especially if added as a dry mix in a powder form to another SLS polymer.

And see also US Pat. Pub. 2013/337530, the disclosure of which is incorporated herein by reference.

Testing has been done with regard to certain materials. The ASTM D 5511-18 testing procedure was followed. The results of the testing have been positive in terms of biodegradability. Set forth below are the powder properties that have been tested, and the resulting tensile properties.

1) The PCG-LV an Arkema grade of nylon 11 in pellet form. Generically, a low viscosity nylon 11 pellet. The PC refers to the part cake, which is the powder bed material that the part is removed from surrounding the object after the melting/solidification process.

2) PCG-LV, which had no additive, functioning as the control. PCG-LV 0.5% MB-67, PCG-LV with 0.5% of the EcoTech/EcoPure MB-67 additive PCG-LV 1% BS-201j, PCG-LV with 1% of the BioSphere BS-201j additive 3) ASTM D638, type 1 bar, 6"×½"×⅛"

| Power Properties | | | | | |
|---|---|---|---|---|---|
| Sample | eos (° C.) | Melt Temp (° C.) | PSD (μm) | ADT (/cc) | MFR (g/10 min) |
| PCG-LV | 16 | 189.44 | 79.7 | 0.37 | 75.5 |
| PCG-LV PC | 16 | 189.50 | 76.6 | 0.38 | 53.4 |
| PCG-LV 0.5% MB-67 | 16 | 189.46 | 74.8 | 0.37 | 76.7 |
| PCG-LV 0.5% MB-67 PC | 17 | 189.86 | 67.2 | 0.33 | 49.7 |
| PCG-LV 0.5% MB-67 PC Oxidized | 19 | 189.98 | 67.9 | 0.31 | 37.7 |
| PCG-LV 1% BS-201j | 17 | 189.64 | 80.1 | 0.39 | 77.4 |
| PCG-LV 1% BS-201j PC | 20 | 188.29 | 66.2 | 0.37 | 47.5 |

EOS—Extrapolated Onset—Distance Between Onset of Melting and Onset of Recrystallization on DSC Curve

| Tensile Properties | | | | |
|---|---|---|---|---|
| Sample | Part Density (g/cc) | Tensile Strength (MPa) | Tensile Modulus (MPa) | % Elongation |
| PCG-LV | 1.03 | 48 | 1673 | 23 |
| PCG-LV 0.5% MB-67 | 1.03 | 50 | 1586 | 27 |

From the test data, it appears that increasing from a 1% concentration to a 2% of the additive concentration increases the degradation rate by 60%. The end result is that the entire product will completely return to nature. The majority of the mass will be released of methane gas and the balance will be biomass and water. The expectation is that the degradation, once begun, will be complete in a span of just a handful of years, versus tens or hundreds of years.

Figure 3:
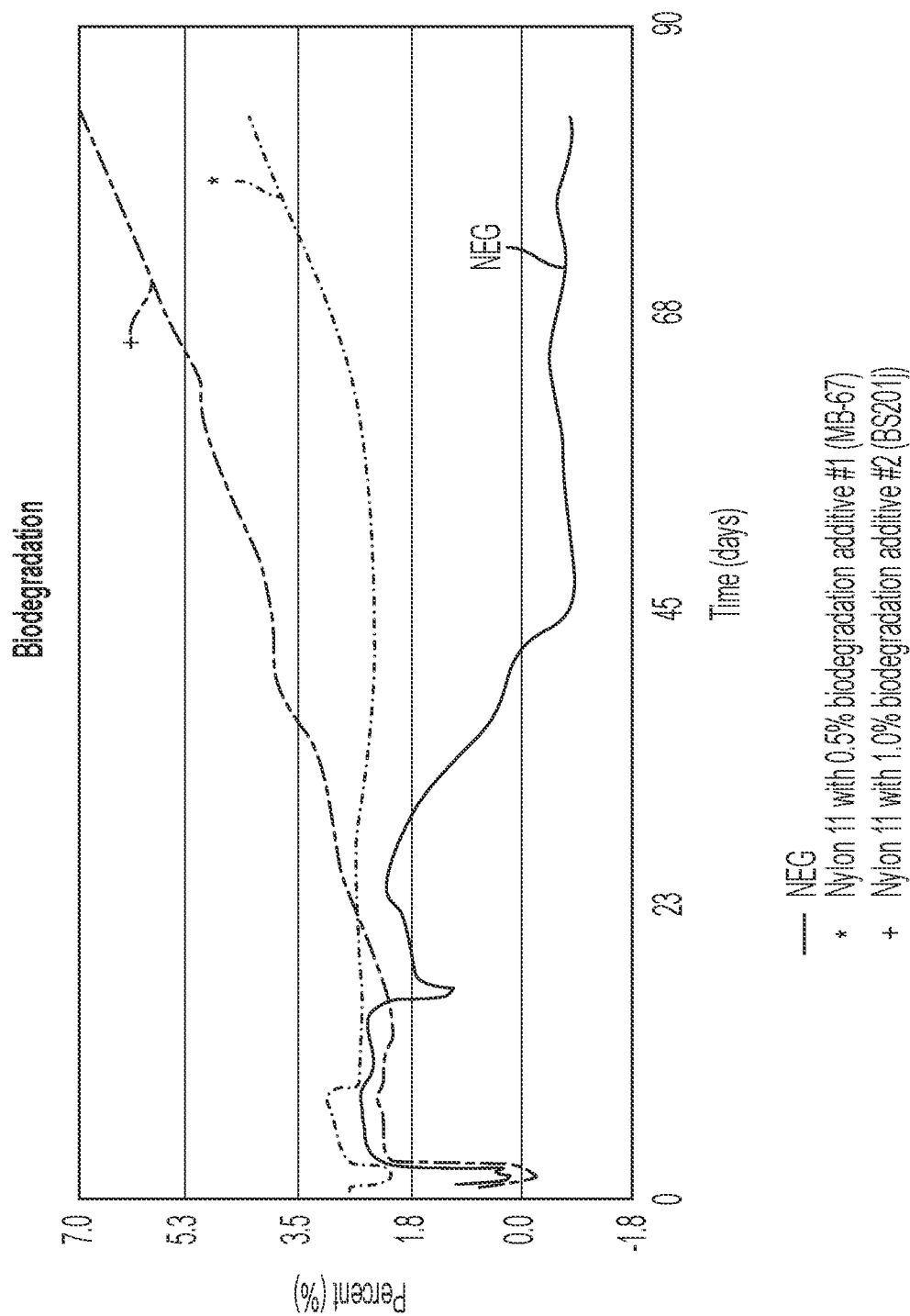
FIG. 3 illustrates another graph showing biodegradation over time according to at least one of the presently disclosed embodiments.

FIG. 1 is a chart compiling testing data of the degradation process, here at approximately 83 days. FIG. 2 charts the biodegradation during this testing period. FIG. 3 charts the data over the same timeframe.

Inculum refers to the representative bacterium, such as would be found in a common landfill, as inoculum. Negative is a nylon sample (polyethylene) with no additive. Positive is cellulosic material. Percent in FIG. 2 is the amount of degradation over time. FIG. 3 Percent in this table compares the percentages as set forth in the chart of FIG. 1, to the Negative material; essentially, a more granular (more detailed) representation of the curves of FIG. 2, with the POS curve removed.

Thus, while the invention has been described herein as to certain embodiments, objectives, advantages and the like, those of skill will recognize changes, modifications, further properties and alternatives which will still fall within the scope and spirit of the invention.

What is claimed is:

1. An improved build material for use in additive manufacturing of a three dimensional object which is generated through layerwise build-up of the build material corresponding to consecutive cross sections of the object to be built, wherein the improvement comprises:

a biodegrading additive incorporated in the build material which facilitates the decomposition of the build material when the material is placed in an environment for disposal, wherein the build material is nylon-11, nylon-12, or polypropylene.

2. The improved build material of claim 1, wherein the build material is a polymeric powder.

3. The improved build material of claim 2, wherein the build material is adapted for powder based fusion additive manufacturing.

4. The improved build material of claim 1, wherein the biodegradable additive is adapted for a landfill disposal environment.

5. A method for making a biodegradable additive manufacture material, comprising:
   providing a base build material for use in making an object, where the object is generated through layerwise build-up of build material corresponding to consecutive cross sections of the object to be built, the build material including one or more of nylon-11, nylon-12 or polypropylene; and
   introducing a biodegrading additive that is incorporated in the build material which facilitates a physical and/or chemical decomposition of the object when the object is placed in an environment for disposal.

6. The method of claim 5, wherein the environment is a landfill.

7. The method of claim 5, wherein the base build material is a polymer comprising Nylon-11.

8. The method of claim 5, wherein the base build material is a polymer comprising Nylon-12.

9. The method of claim 5, wherein the base build material is a polymer comprising polypropylene.

* * * * *